United States Patent [19]

Farr

[11] Patent Number: 4,654,551
[45] Date of Patent: Mar. 31, 1987

[54] PERMANENT MAGNET EXCITED ALTERNATOR COMPRESSOR WITH BRUSHLESS DC CONTROL

[75] Inventor: James B. Farr, Ann Arbor, Mich.

[73] Assignee: Tecumseh Products Company, Tecumseh, Mich.

[21] Appl. No.: 736,299

[22] Filed: May 20, 1985

[51] Int. Cl.[4] ........................................... H02K 21/04
[52] U.S. Cl. .................................. 310/112; 310/153; 310/181
[58] Field of Search ............... 310/49, 68 D, 112, 153, 310/156, 181, 263, 266

[56] References Cited

U.S. PATENT DOCUMENTS

| | | | |
|---|---|---|---|
| 2,564,320 | 12/1948 | Brainard | 322/28 |
| 2,892,109 | 10/1956 | Gayler | 310/153 |
| 3,396,325 | 7/1965 | Hopkins | 322/46 |
| 3,411,027 | 7/1965 | Rosenberg | 310/181 |
| 3,443,201 | 10/1966 | Williams | 322/28 |
| 3,493,800 | 6/1968 | Barrett | 310/168 |
| 3,671,788 | 6/1972 | Knudson et al. | 310/156 |
| 4,087,713 | 5/1978 | Binder | 310/266 |
| 4,095,922 | 6/1978 | Farr | 417/313 |
| 4,097,754 | 6/1978 | Farr | 310/67 R |
| 4,169,360 | 10/1979 | Shimizu | 62/323 |
| 4,203,710 | 5/1980 | Farr | 417/53 |
| 4,388,545 | 6/1983 | Honsinger et al. | 310/156 |
| 4,421,998 | 12/1983 | Ahner et al. | 310/263 |

FOREIGN PATENT DOCUMENTS 238299 2/1965 Austria .

OTHER PUBLICATIONS

Bennett and Gaines publication "A New Ultra Lightweight Automotive Air Conditioning Compressor and Clutch", Society of Automotive Engineers, 0148-7191/82/0222-077, 6 pages.

Primary Examiner—Patrick R. Salce
Assistant Examiner—D. L. Rebsch
Attorney, Agent, or Firm—Jeffers, Irish & Hoffman

[57] ABSTRACT

A combined alternator-compressor including a brushless excitation structure for the alternator. The magnetic flux field for the alternator is generated by a rotating permanent magnet ring structure and a stationary toroidal control coil which is arranged concentrically with and between the rotating permanent magnet ring and an alternator base. The control coil is mounted in additive and subtractive magnetic relationship with the permanent magnet ring for control of the magnetomotive excitation field of the alternator.

19 Claims, 9 Drawing Figures

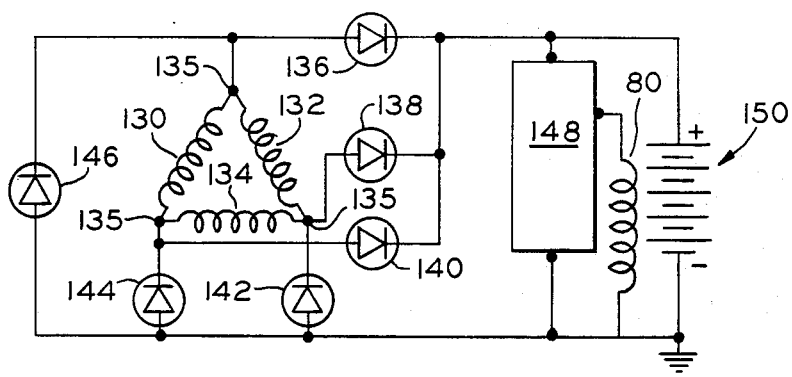
FIG. 3
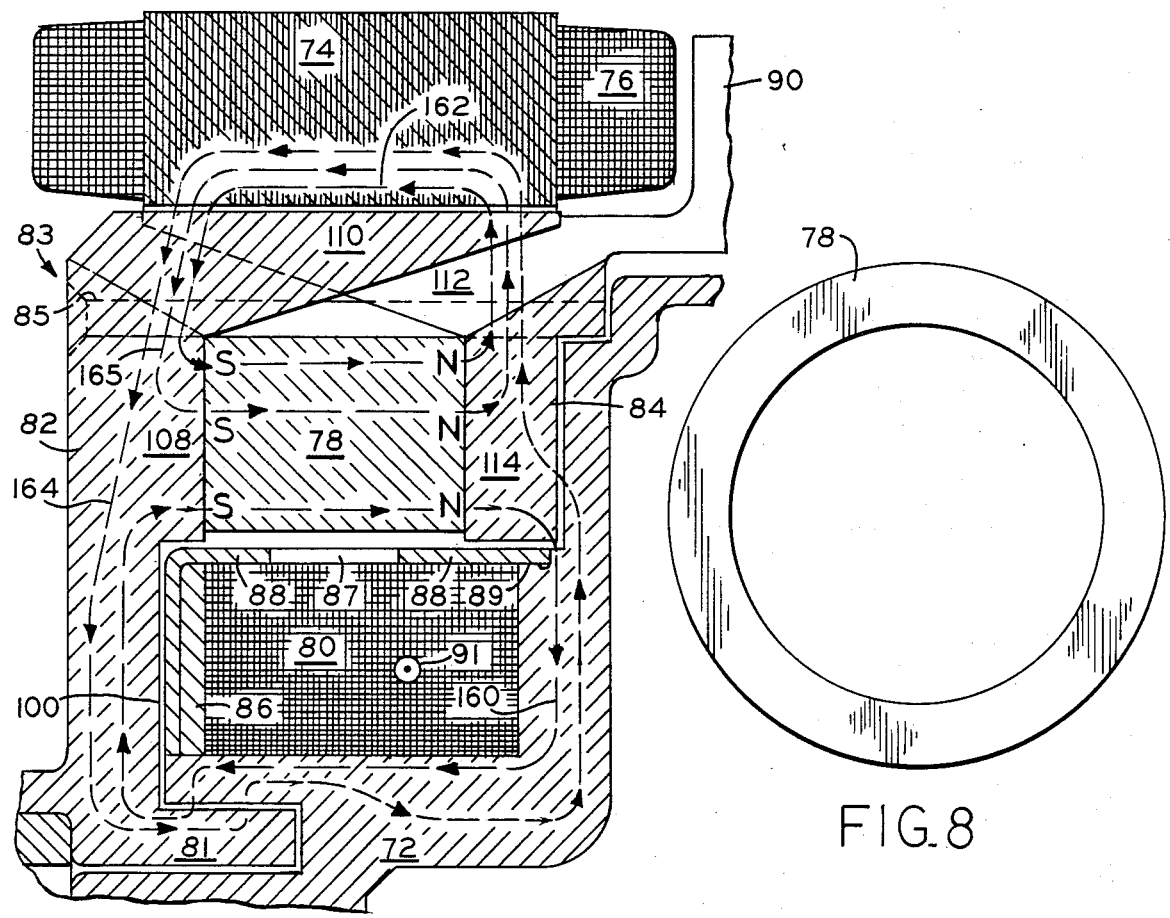
FIG. 7
FIG. 8
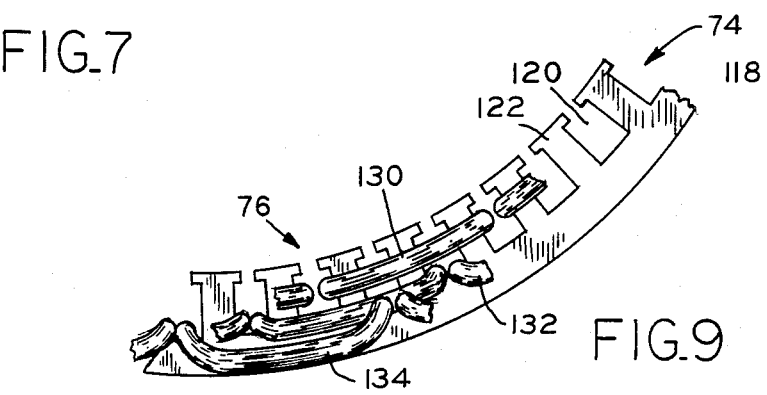
FIG. 9

PERMANENT MAGNET EXCITED ALTERNATOR COMPRESSOR WITH BRUSHLESS DC CONTROL

BACKGROUND OF THE INVENTION

The present invention relates generally to a combined alternator compressor unit for providing both the electrical energy generating function and air conditioner refrigerant pumping function in an automotive vehicle.

Automotive vehicles have customarily included an internal combustion engine as a prime mover which, in addition to propelling the vehicle, drives a number of ancillary devices. The engine ordinarily drives an electrical generator or alternator and several pumps including an air conditioner pump or compressor.

Typically the alternator and refrigerant compressor will each be driven from the engine crankshaft by way of V-belts and pulleys. The alternator typically revolves at high speed to generate a relatively high frequency alternating voltage. With such relatively high frequency alternating voltages stator core losses are normally relatively high, thereby decreasing the efficiency of the alternator.

Typically compressors are actuated by means of an electromagnetic clutch. Much of the time the electromagnetic clutch is not actuated and the compressor pulley is freewheeling and contributes nothing to the loading of the engine except frictional losses. When the system calls for the compressor to pump refrigerant, the clutch is actuated and causes the compressor pulley to drive the compressor.

In some prior art systems the alternator and compressor have been combined into one unit. One example of such a combined alternator compressor unit is disclosed in U.S. Pat. No. 4,095,922 which is assigned to the same assignee of the present application. In this structure the magnetic field for the altenator is generated by a rotating ring of multiple permanent magnets whose rotating magnetic flux field is cut by three sets of stationary coils associated with a stator to thereby generate electric voltages in the coils. The coils are arranged in a toroidal configuration in the stator core slots and the stator is concentrically disposed within the permanent magnet ring. The coils are electrically connected in a Delta configuration. The generated voltage is a function of the velocity of the engine and the rotational speed of the alternator. The required voltage is a function of the system demand for electrical energy. The generated voltage must therefore be controlled to match the required voltage for the most efficient operation of the system.

Some prior art alternators have been provided wherein the excitation field is provided by a rotating electromagnetic coil. Such alternators require sliding contact members in the form of slip rings and brushes to connect the rotating coil to a source of direct voltage. A disadvantage of these alternators is that such sliding contact members are subject to wear and therefore require periodic servicing.

One of the difficulties with prior art alternators has been that the generated electric voltage could be controlled only at considerable expense. Thus, in known alternators of this type one technique which has been used for regulating the voltage is to insert silicon controlled rectifiers (SCR's) in the power circuit. This is undesirable, as it requires control of a large amount of power. Controlling the full alternator power output via this SCR voltage regulator is expensive.

Other prior art alternators have been provided with stationary exciter coils as the only source of alternator magnetic field flux. One patent disclosing such a structure is U.S. Pat. No. 3,493,800. A disadvantage of this type of structure is that a considerable amount of excitation field current must be provided to generate the necessary magnetic field strength. This complicates control of the generated voltage since a relatively large amount of excitation current must be controlled. Also, the excitation winding needs to be fairly bulky which is undesirable in automotive applications where space and weight must be kept to a minimum.

In some permanent magnet excited alternators one technique which has been used for controlling the generated voltage has been to render the available magnetic flux variable by premagnetization. To this end, the stationary armature of the machine is provided with a direct current carrying ring winding through which a variable tangential premagnetization is imparted to the core of the armature in order to control the available magnetic flux. In this type of control arrangement it has been found to be particularly advantageous to at least partially combine the direct current carrying ring winding, which effects premagnetization, with the induced current operating winding. With such an arrangement a comparatively simple device is provided in which the regulation of the available magnetic flux enables control of the generated voltage.

A permanent magnet excited electric generator wherein the excitation magnetic flux is controlled by a direct voltage control winding is disclosed in U.S. Pat. No. 3,411,027. The electric generator includes a controlled magnetomotive excitation force which is generated by permanent magnets and a control coil. The useful magnetic flux, and therefore the generated voltage, is controllable by varying the direct voltage applied to the control coil. The magnetomotive force generated by the coil is combined in shunt relationship with the magnetomotive force generated by the permanent magnets and therefore increases or decreases the resultant useful excitation flux, depending upon the polarity and magnitude of the shunt excitation voltage. A disadvantage of this arrangement is that the coil and permanent magnets are spaced axially thus resulting in a rather large axial dimension for the alternator. The large axial dimension requires additional space and the use of a plurality of bearings for the alternator unit.

It is therefore desired to provide a combined alternator-compressor unit having a small axial dimension wherein the alternator magnetomotive excitation force is generated by permanent magnets and a field coil and wherein the alternator is mounted on a single bearing.

It is also desired to provide a combined alternator-compressor including permanent magnets and a stationary control coil to provide brushless, easily controlled magnetomotive excitation for the alternator.

It is furthermore desired to provide a brushless compact alternator-compressor unit wherein the permanent magnets and excitation coil are concentrically arranged in a compact, lightweight structure which is easy to assemble and has small electromagnetic losses.

SUMMARY OF THE INVENTION

The present invention overcomes the disadvantages of the above described prior art alternators and alternator-compressors by providing an improved combined alternator-compressor which is very compact and wherein the magnetomotive excitation force is generated by a concentrically arranged direct current coil and a permanent magnet.

The present invention comprises a brushless combination alternator-compressor including a rotating permanent magnet ring structure and a stationary toroidal control coil. The toroidal direct current control coil is arranged concentrically with and intermediate the rotating permanent magnet ring and an alternator base. The control coil is mounted in additive and subtractive magnetic relationship with the permanent magnet ring for control of the magnetomotive excitation field of the alternator.

The invention still further comprises a combined alternator compressor, wherein the alternator excitation field is induced by means of a rotating permanent magnet ring and a single stationary coil and wherein the voltage output of the alternator is regulated by controlling the excitation of the coil. The coil is mounted concentrically with the permanent magnet ring and is magnetically in shunt relation therewith. A single control coil is used to control both the north and south poles. By positioning the single control coil radially rather than axially with respect to the permanent magnet structure a very compact structure is provided with a small axial dimension. A single bearing is used for rotatably mounting the rotating portions of the alternator structure.

An advantage of the present invention is the compact structure wherein only a single control coil is mounted in concentric relationship with the permanent magnet structure whereby the axial dimension of the alternator is much reduced from prior art alternator structures.

An additional advantage of the present construction is that the alternator magnetic field control coil controls both the magnetic north and south poles of the alternator magnetic structure whereby a more compact structure is generated than was possible with prior art arrangements.

A further advantage of the present invention is that the structure is very efficient and has small magnetic losses.

Yet another advantage of the present invention is the simplicity of construction whereby the manufacturing cost of the alternator-compressor is lower than the manufacturing cost of prior art alternators.

Yet further advantages of the present invention are the small space requirements and low weight of the alternator-compressor structure.

The invention, in one form thereof, comprises a unitary alternator-compressor assembly including a magnetic flux field generating assembly comprising a stationary toroidal magnetic field coil for generating magnetic flux which is connected to a source of direct voltage. A rotatable permanent magnet is concentrically arranged with the coil. A rotor is concentrically arranged with both the coil and permanent magnet and forms a part of the magnetic flux path for the coil and permanent magnet. A cylindrical stator is concentrically arranged with the rotor for completing the magnetic flux path and includes a stator coil whereby rotation of the rotor generates a voltage in the stator coil.

The invention, in one form thereof, still further provides a unitary alternator-compressor comprising a compressor housing, and a cylindrical magnetizable alternator housing concentric with the compressor housing. A stationary cylindrical coil surrounds a portion of the alternator housing and is concentric therewith. The coil is connected to a source of electric voltage. A cylindrical permanent magnet is rotatably and concentrically arranged around both the coil and a rotor including interleaved pole pieces which surround the permanent magnet. The stator is concentric with and surrounds the rotor so that the stator, the rotor and the alternator base comprise a magnetic flux path for the flux generated by the coil and permanent magnet, the flux traversing the stator being proportional to the magnitude of the voltage supplied to the field coil.

The invention, in one form thereof, still further provides a unitary alternator-compressor for a vehicle, the compressor including a non-magnetic front housing. An alternator is mounted on and surrounds the housing, the alternator comprising a cylindrical stator including a stator coil, a field coil concentric with and located within the stator. The field coil is mounted on a magnetizable shell. A rotor, including a permanent magnet is concentrically and rotatably interposed between the field coil and the stator and is rotatably driven for generating a voltage in the stator coil.

It is an object of the present invention to provide a unitary alternator-compressor assembly including only a single control coil which is mounted in concentric relationship with the permanent magnet.

It is another object of the present invention to provide a unitary alternator-compressor assembly which is very compact.

It is yet another object of the present invention to provide a unitary alternator-compressor including an alternator magnetic field control coil which controls both the north and south poles of the alternator structure.

It is a further object of the present invention to provide a very efficient alternator-compressor structure which has low magnetic losses.

It is a still further object of the present invention to provide a very simple alternator-compressor construction whereby the manufacturing cost is much lower than the manufacturing cost of prior art alternator-compressors.

It is a yet further object of the present invention to provide an alternator-compressor structure which weighs less than prior art alternator-compressors.

BRIEF DESCRIPTION OF THE DRAWINGS

The above-mentioned and other features and objects of the invention, and the manner of obtaining them, will become more apparent and the invention itself will be better understood by reference to the following description of an embodiment of the invention taken in conjunction with the accompanying drawings, wherein:

FIG. 3 is a schematic electrical diagram, partially in block form, illustrating one electrical circuit arrangement for the voltage generating system;

FIG. 7 is a partial enlarged sectional view of the magnetic structure of the alternator of FIG. 1;

FIG. 8 is an elevational view of the permanent ring magnet;

FIG. 9 is an enlarged view of a section of the stator assembly including a portion of the stator coils.

Corresponding reference characters indicate corresponding parts throughout the several views of the drawings.

The exemplifications set out herein illustrate a preferred embodiment of the invention, in one form thereof, and such exemplifications are not to be construed as limiting the scope of the disclosure or the invention in any manner.

DESCRIPTION OF THE PREFERRED EMBODIMENT

Figure 1:
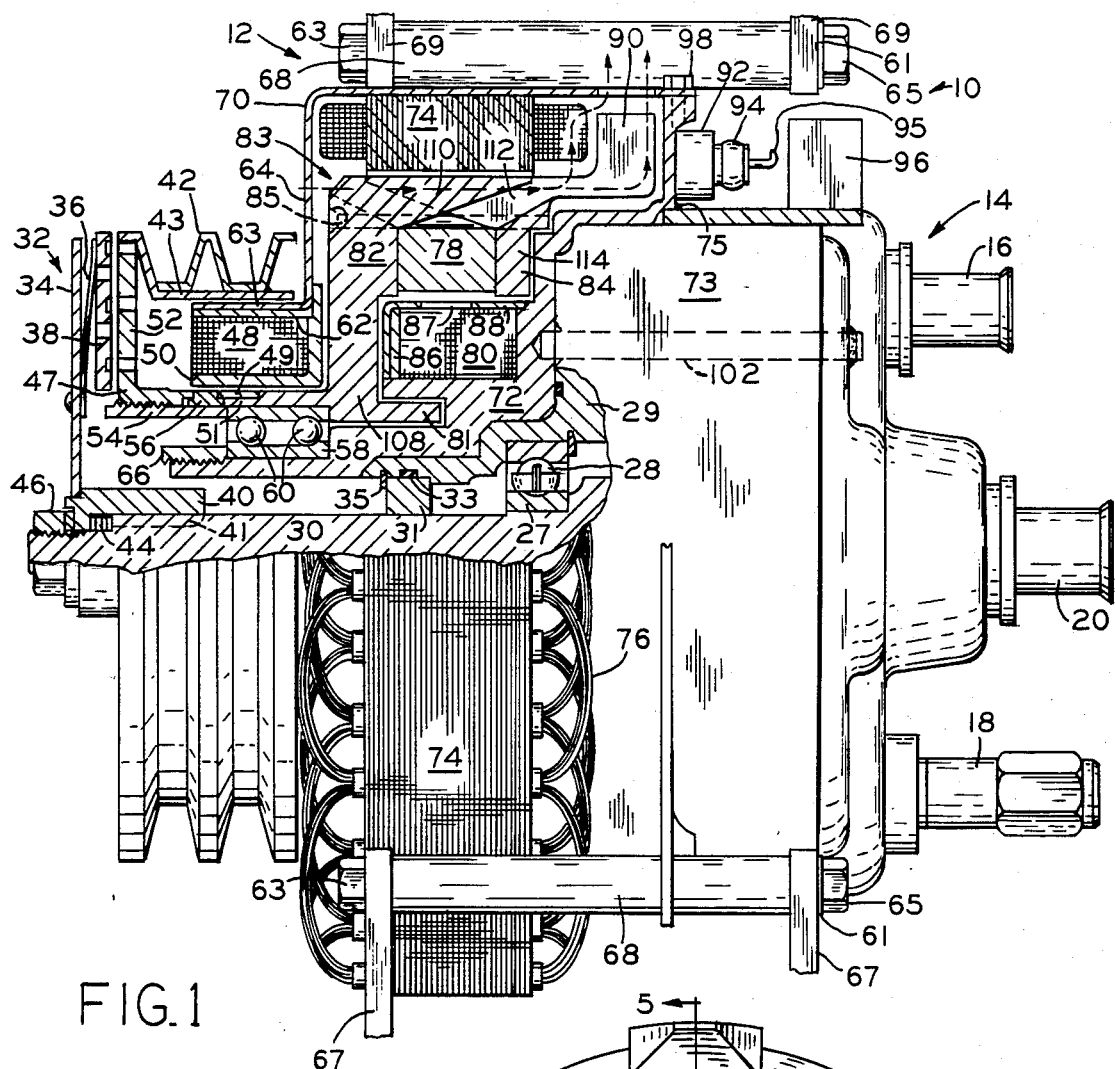
FIG. 1 is an elevational view, partially in cross section, of the alternator compressor.
Figure 4:
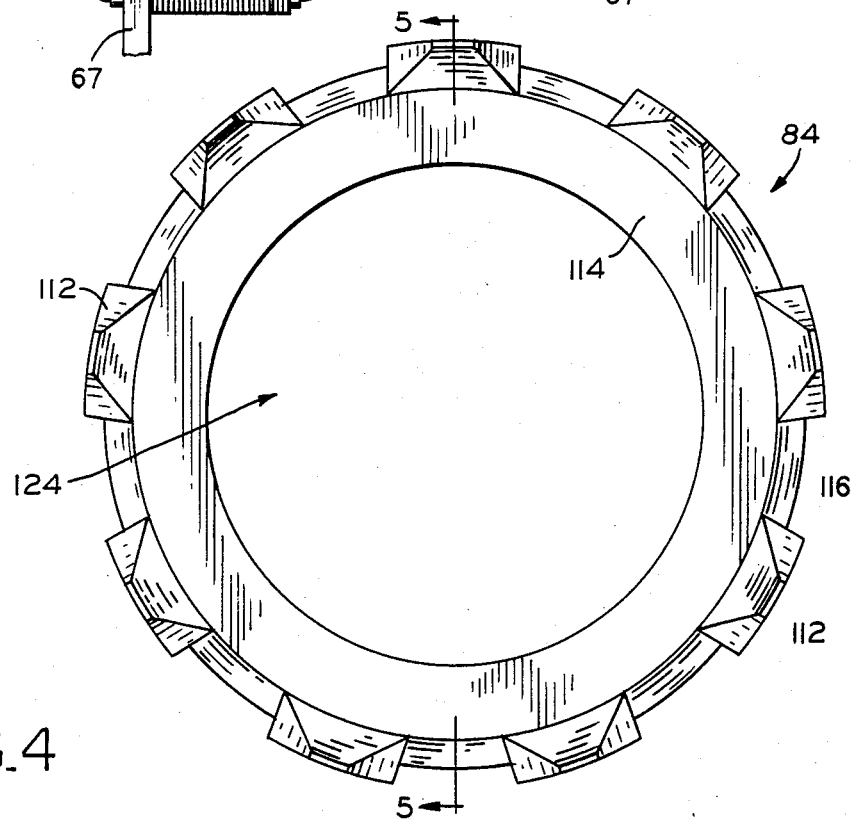
FIG. 4 is an elevational view of the rear half of the alternator rotor.

Referring now to FIG. 1 what is shown is an alternator compressor assembly 10 including a forwardly located alternator section 12 and a rearwardly located compressor section 14. The compressor section includes discharge outlet 16 and suction inlet 20, both of which are connected to refrigeration lines of the vehicle air conditioning system with quick connect couplings. Line 18 is provided with a valve for relief of extreme refrigerant pressure. The compressor includes a front compressor bearing 27 including bearing balls 28. A relatively thin compressor crankcase 29, preferably constructed of aluminum, extends over front compressor bearing 27 and over rotating seal 31 including O-ring 33. Snap ring 35 is provided for maintaining seal 31 in position.

Compressor crankshaft 30 is provided for driving the working parts of the compressor (not shown) in a conventional manner. A compressor clutch 32 is provided for selectively driving the crankshaft, and includes a clutch support plate 34 which is biased away from armature plate 38 by means of three clutch springs 36 in a conventional manner.

The clutch and drive structure for the compressor alternator of the present invention is disclosed in copending U.S. patent application, Ser. No. 736,389, which was filed on the same day as the present application and which is assigned to the assignee of the present application.

Hub 40 for driving compressor crankshaft 30 is maintained on crankshaft 30 by means of crankshaft nut 46. Key 41 engages positively with key slots in hub 40 and crankshaft 30. The clutch working air gap is set by means of clutch washer stack 44. Clutch support plate 34 is secured to hub 40 in any suitable manner, such as by welding. A double pulley 42 is provided for driving engagement by means of a pair of belts (not shown) to a driving pulley (not shown) which is secured to the engine crankshaft (not shown). The use of a double pulley 42 enables the use of a small diameter pulley, thereby conserving space.

Clutch coil 48 is located concentrically with and internally of pulley 42 for selectively establishing a magnetic field for attracting armature plate 38 toward clutch plate 52 to cause engagement therebetween. A stationary clutch inner pole piece 50 and outer pole piece 62 are located adjacent coil 48 for conducting magnetic flux generated by clutch coil 48. Flange 64, which forms part of alternator housing 70, is preferably made of steel, and completes the magnetic structure for the alternator clutch.

The magnetic flux path for the clutch is arranged with negligble air gaps at the interfaces between the several parts, whereby the structure is magnetically more efficient than prior art electromagnetic compressor clutch structures and whereby a smaller clutch coil may be used, thereby conserving space and weight.

An externally threaded nut 54 is engaged with clutch plate 52 for securing the outer race of a double row alternator bearing 58 including bearing balls 60 to alternator front rotor half 82. A portion 49 of horizontally arranged cylindrical flange 47 of clutch plate 52 overlaps a horizontal cylindrical portion 51 of rotor front half section 82 and is secured therewith by means of pins 56. Preferably a plurality of such pins are provided. An internally threaded nut 66 is threadedly received on a threaded portion of alternator base 72 for securing the inner race of bearing 58 to alternator base 72.

Thus as clutch coil 48 is energized the magnetic flux generated by the coil traverses clutch inner stationary pole piece 50, clutch outer stationary pole piece 62, clutch plate 52, nut 54, pins 56, and front rotor half 82. The magnetic flux causes armature plate 38 to be magnetically attracted to clutch plate 52 in opposition to the spring bias force of clutch springs 36. Armature 38 will thus be frictionally drivingly engaged with clutch plate 52. Thus as pulley 42 rotates together with clutch plate 52, armature plate 38 will be frictionally driven by clutch plate 52. Armature 38 drives clutch support plate 34 and causes hub 40 to rotate. By reason of the engagement of key 41 with hub 40 and crankshaft 30, crankshaft 30 will rotate, thereby operating the working parts of the compressor. Alternatively, when clutch coil 48 is not energized, armature plate 38 will not be driven and crankshaft 30 will be stationary whereby the compressor is not operated. Clutch coil 48 is controlled by a conventional control circuit (not shown).

It should be readily appreciated that the use of a single bearing for mounting the rotor of the compressor together with the novel manner of securing the bearing is very advantageous as it eliminates a number of intermediate parts required in conventional compressor alternator arrangements. Bearing outer race locking nut 54 provides the combined functions of locking the outer bearing race in place, retaining the drive pins 56 in position, tensioning the locking pins 56, conducting magnetic flux as well as providing a grease shield for the clutch working air gap. Such an arrangement is highly advantageous and permits the elimination of a number of parts required in prior art structures.

It should also be readily apparent that the attachment of the compressor clutch structure to the alternator rotor assembly by means of portion 49 of flange 47 which overlaps flange portion 51 of the alternator rotor front portion 82 forms a very compact structure. Flanges 49 and 51 are machined to precise slip fit diameters to assure good concentricity of pulley 42 with the compressor crankshaft axis and with the axis of bearing 58. This precise radial alignment is also important in maintaining good control over the flux transfer gap between rotor pulley portion 43 and portion 63 of flange 64 so that portion 43 and flange portion 63 never scrub or operate at excessive gap. A uniform airgap is thereby maintained around the circumference of the clutch. The lapped joint between flange portions 49 and 51 also forms a major flux conduction path since the air gap at the slip fit overlap is very small and since the lapped area is relatively large. The arrangement of nuts 54 and 66 also provides high clamping forces on both the inner and outer bearing races of double row ball bearing 58 thereby providing good alignment of the working parts. This arrangement therefore permits high speed operation of the system without interference between moving and stationary parts.

Figure 2:
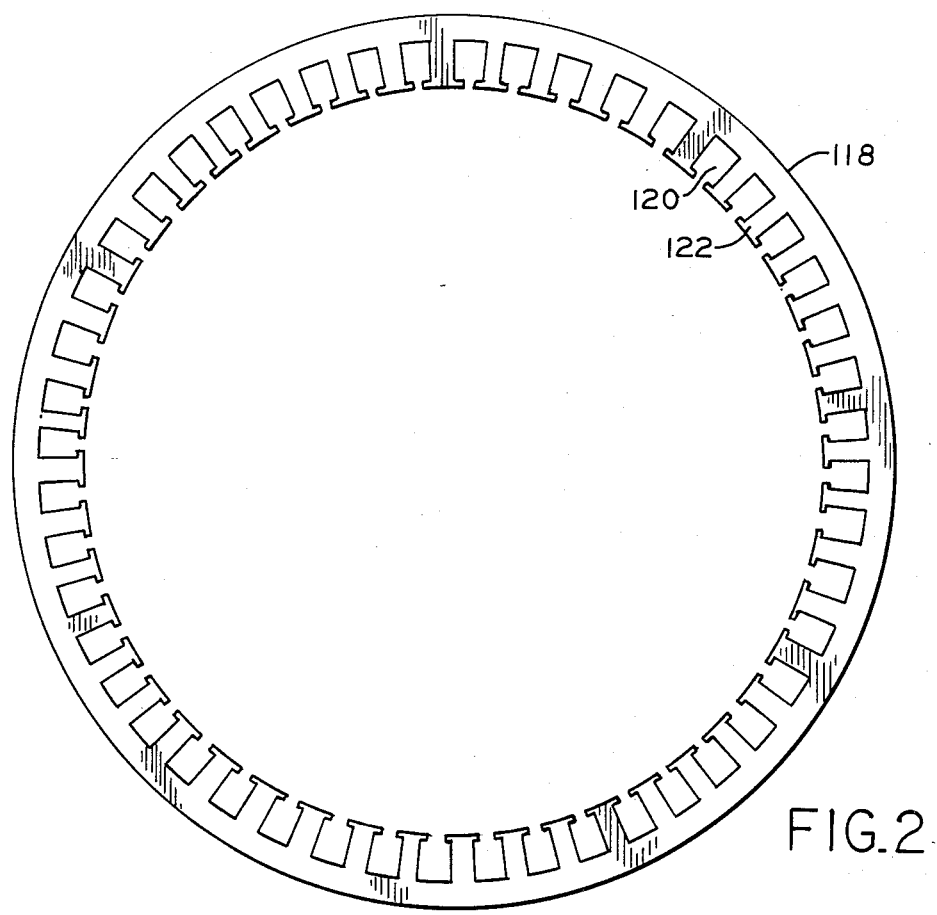
FIG. 2 is an elevational view of the stator lamination stack.
Figure 5:
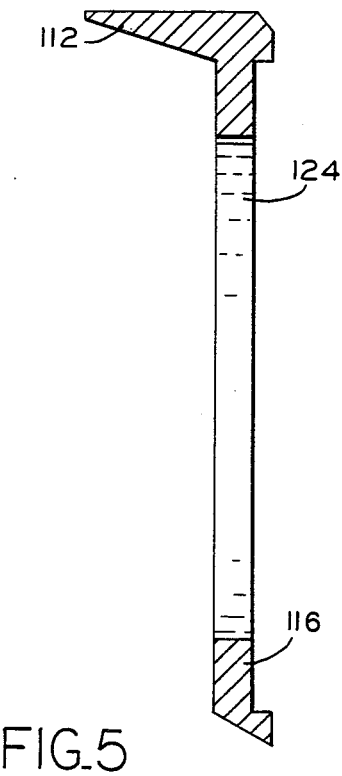
FIG. 5 is a sectional view of the alternator rotor half of FIG. 4 taken along line 5—5.
Figure 6:
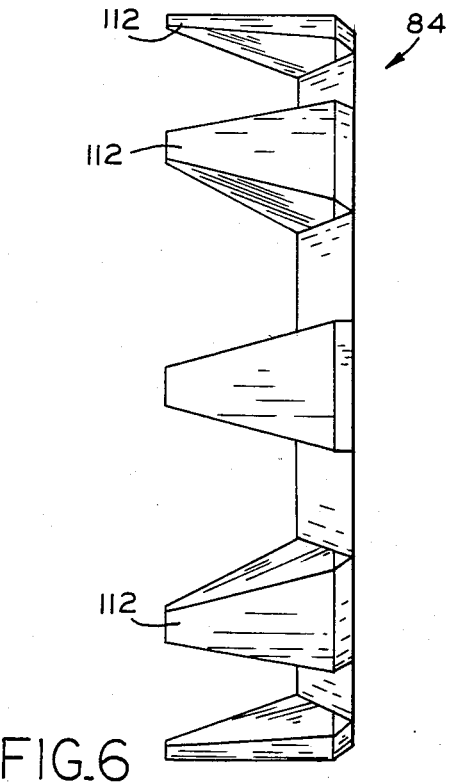
FIG. 6 is a side view of the alternator rotor half of FIG. 4.

Continuing now by reference to FIGS. 1, 2, and 4–6, the alternator structure includes alternator base 72 and alternator housing 70 which is secured to alternator base 72 by means of fasteners 98. Alternator housing 70 is preferably constructed of steel and includes mounting brackets 68 for securing the alternator-compressor assembly to the vehicle engine. Mounting brackets 68 are attached to engine mounting brackets 67 and 69 by means of thru-bolts 63 and nuts 65 and washers 61. Alternator base 72 is secured to compressor housing 73 by welding such as circumferential weld 75. Stator 74 comprises a conventional cylindrical stator lamination stack as shown in FIG. 2. Stator coils 76 are located in the stator slots located around the internal periphery of the stator lamination stack. Permanent ring magnet 78 is located concentrically with and internally of stator 74. Alternator field coil 80 is located internally of ring magnet 78 and is concentric therewith. Thus stator 74, permanent magnet ring 78 and field coil 80 form a concentric structure with stator 74 being the outermost element and coil 80 being the innermost element of the structure.

The rotor structure for the alternator includes rotor front half 82 and rotor rear half 84. Alternator rotor halves 82 and 84 are secured together with a plurality of fasteners (not shown) such as threaded bolts located in apertures 85, one of which is shown. Flange 81 of rotor half 82 forms the major flux transfer path between rotor half 82 and alternator base 72, owing to the fact that radial gaps associated with flange 81 are very small. Use of these small air gaps is made possible by the good radial alignment afforded by adjacent bearing 58. Ferromagnetic components 86 and 88 act to further reduce the reluctance of the flux transfer gaps. Shell 88 also serves as a protective and retaining enclosure for coil 80 and is crimped circumferentially onto alternator base 72 at 89. Shell 88 contains a band of holes 87 in its periphery in order to limit the amount of flux shunted through its center cylindrical section.

Fan 90 is provided for cooling the alternator structure. Fan 90 is secured to the alternator rotor rear half 84 by suitable means such as threaded screws. By utilizing the maximum possible diameter for fan 90, good centrifical blower action is achieved. Air is drawn in through the relatively open rotor pole pieces and through suitable holes (not shown) circumferentially arranged in the front face of housing 64. Movement of the fan blades past stator windings 76 provides good forced air cooling for the windings. Air exits through holes in the alternator housing 70 adjacent the maximum radii fan blade tips.

Rectifiers 94 are provided for rectifying the alternating voltage generated by the alternator. Rectifiers 94 include terminals 95 for connection to electrical leads (not shown) of the associated circuitry such as a voltage regulating circuit. A heat sink 92 is provided for rectifiers 94 as shown. Voltage regulator assembly 96 regulates the voltage generated by the alternator. Weld pins 102 are welded to alternator base assembly 72 and to the rear side of compressor housing 73 for further securing the compressor housing to the alternator.

Rotor front half 82 includes a circular flange portion 108 as best shown in FIG. 7. Rotor front half 82 and rotor rear half 84 include a plurality of teeth 110 and 112 respectively. Teeth 110 and 112 of front and rear rotor halves 82 and 84 are arranged in circumferentially alternating fashion so that they interlock. Rear rotor half 84 includes a circular flange portion 114 including a central aperture 124 for accomodating excitation coil 80, shell 88 and shoulder portion 89 of alternator base 72. Permanent magnet ring 78 is clamped between the front and rear rotor halves for rotation therewith.

Referring now to FIGS. 1, 2, and 9, stator 74 includes a stator lamination stack 118 including stator teeth 122 for forming stator core slots 120. Stator coils 76 includes stator coil windings 130, 132, and 134 which are circumferentially arranged in slots 120 in overlapping fashion as best seen in FIG. 9.

Referring to FIG. 3 it can be seen that windings 130, 132, and 134 are connected in a Delta electrical connection with each winding junction 135 connected by way of diodes 136–146, to the positive and negative terminals of storage battery 150. Voltage regulating circuit 148 which is housed in voltage regulator assembly 96 senses the voltage across the battery and provides the control voltage for controlling the current through alternator field coil 80.

Referring now to FIG. 7, an enlarged portion of the alternator magnetic structure of FIG. 1 is shown with flux lines 160, 162, 164 and 165. Field coil 80 is connected to the system battery to form north and south poles opposed to the north and south poles of permanent magnet ring 78. Thus the magnetomotive force generated by coil 80 will oppose the magnetomotive force of permanent magnet ring 78.

When the current in control coil 80 is zero, flux from permanent magnet 78 is shunted through alternator base 72, as represented schematically by flux line 160. As coil current is increased from zero in the positive sense as shown by single turn 91, flux in alternator base 72 decreases toward zero, and flux from permanent magnet 78 is forced through stator 74. This condition is represented schematically by flux line 162. As coil current is increased further, flux in alternator base 72 traverses a zero point and then increases in magnitude. This flux through alternator base 72 adds to flux from magnet 78, and passes through stator 74 as represented schematically by flux lines 164 and 165 respectively. When current in coil 80 is at a maximum value, flux in stator 74 will be at a maximum, producing a high level of open-circuit generated voltage in stator windings 76. By suitably connecting field coil 80 to voltage regulator circuit 148, control of the generated voltage of the alternator can be effected.

Alternator 12 operates to generate a voltage by means of the rotation of rotor 83, whereby teeth 110 and 112 cyclically cause the flux path through stator 74 and air gap 100 to be interrupted, and whereby the continually changing flux in stator coils 76 causes a voltage to be generated therein in accordance with Faraday's law.

Thus it is seen that by suitable control of the relatively small excitation current of coil 80, the amount of flux which is caused to flow through stator core 74 and rotor 83 can be varied as desired, thereby varying the voltage generated by the alternator.

Through control of the magnitude of the voltage applied to field coil 80 by means of the voltage regulator 148 the output voltage generated by the alternator is held constant for varying rotational speeds of the vehicle engine and for varying systems demand. This is achieved simply by controlling a small field coil voltage whereby the efficiency of the system is much improved over prior art structures.

It is readily apparent that the construction wherein alternator field coil 80 is concentrically arranged with respect to permanent magnet ring 78 is very compact, whereby the front to rear dimension of the alternator is kept to a minimum.

Furthermore, by means of this compact construction the amount of steel necessary for alternator base 72, shell 88, and component 86 is kept to a minimum, thereby keeping the weight of the alternator to a minimum. Thus what has been provided by this advantageous construction is a compact alternator compressor assembly, including a flux field generated by a permanent magnet and electromagnetic coil, wherein control of the generated voltage is easily accomplished by means of controlling the small field coil current. The linked flux paths of the permanent magnet exciting ring magnet and the exciting field coil are additive in part and subtractive in part for advantageous control of the generated voltage.

While this invention has been described as having a preferred design it will be understood that it is capable of further modification. This application is therefore intended to cover any variations, uses, or adaptations of the invention following the general principles thereof and including such departures from the present disclosure has come within known or customary practice in the art to which this invention pertains and fall within the limits of the appended claims.

What is claimed is:

1. In a unitary alternator-compressor assembly, a magnetic flux field generating assembly comprising:
    a single stationary toroidal magnetic field coil means for generating magnetic flux and connected to a source of direct voltage;
    a permanent magnet comprising a continuous ring, said ring rotatably concentrically arranged around said field coil and in the plane thereof;
    rotor means concentrically arranged around said field coil and permanent magnet and in the plane thereof, said rotor means forming a part of the magnetic flux path for said coil and permanent magnet, said rotor means comprising first and second discs, each said disc including a plurality of circumferentially arranged pole pieces, said pole pieces of said respective first and second discs alternatingly interleaved, and said permanent magnet ring clamped between said first and second discs;
    cylindrical stator means concentrically arranged around said rotor and field coil, and in the plane thereof for completing said magnetic flux path, said stator means including a stator coil whereby rotation of said rotor generates a voltage in said stator coil; and
    wherein the flux in said stator varies as a function of the magnitude of the voltage applied to said field coil.

2. The alternator compressor of claim 1 wherein said magnitude of said voltage applied to said field coil is controlled by a voltage regulator.

3. The alternator-compressor of claim 1 wherein the flux generated by said permanent magnet and said field coil are subtractive in certain parts of said flux path and are additive in other parts of said flux path.

4. The alternator-compressor of claim 1 including a stationary compressor housing, a stationary alternator housing secured to said compressor housing, said field coil secured to said alternator housing.

5. The alternator-compressor of claim 1 wherein said compressor housing is a nonmagnetic material and said alternator housing is a ferromagnetic material, said alternator housing forming a part of said magnetic flux path.

6. In a unitary alternator-compressor comprising:
    a nonferromagnetic housing with a driveshaft extending therefrom, said driveshaft defining a driveshaft axis;
    a cylindrical magnetizable alternator housing defining an alternator base and cylindrical portion, said alternator housing and base concentric with said driveshaft axis and secured to said compressor housing;
    a source of electric voltage;
    a single stationary cylindrical field coil concentrically mounted on said alternator housing base, which field coil is coupled to said source of electric voltage;
    a cylindrical permanent magnet rotatably and concentrically arranged around said field coil and in the plane thereof;
    a rotor including interleaved pole pieces surrounding said permanent magnet and field coil and arranged in the plane thereof;
    a stator arranged concentrically with and surrounding said rotor, said stator arranged in the plane of said field coil and rotor;
    said stator, said rotor, and said alternator housing base comprising a flux path for the magnetic flux generated by said field coil and said permanent magnet, the flux traversing said stator being proportional to the magnitude of the voltage supplied to said field coil.

7. A unitary alternator-compressor comprising:
    a compressor housing of a non-magnetic material;
    a compressor drive shaft extending from said compressor;
    an alternator housing having a cylindrical portion, said housing mounted on and secured to said compressor housing about said drive shaft;
    an electrical voltage source;
    a single stationary cylindrical field coil mounted on said alternator housing and coupled to said electrical voltage means;
    a cylindrical permanent magnet rotataby mounted about said field coil;
    a rotor including interleaved pole pieces surrounding said permanent magnet and field coil;
    a stator surrounding said rotor;
    said cylindrical field coil, said permanent magnet, said rotor and said stator being concentric and aligned in the same plane wherein said stator, rotor and alternator housing define a path for magnet flux induced by the relative motion of said field coil and said permanent magnet, which flux traverses said stator and is proportional to the magnitude of the voltage provided to said field coil.

8. A unitary alternator-compressor as claimed in claim 7 wherein said compressor driveshaft extends through said alternator housing cylindrical portion and said alternator compressor further comprises a single double-row alternator bearing mounted on said cylindrical portion.

9. A unitary alternator-compressor housing as claimed in claim 7 wherein said rotor defines a front-half segment and a rear-half segment;

said rotor front-half segment defining a circular flange portion cooperating with said alternator housing cylindrical portion to secure said alternator bearing therebetween to maintain concentricity of said drive shaft, alternator housing and said rotor.

10. In a unitary alternator-compressor for a vehicle, a compressor including a non-magnetic front housing, an alternator mounted on said compressor housing, said alternator comprising:

an alternator housing and base;

a cylindrical stator including a stator coil;

a single field coil concentric with and located in the plane of said stator, said field coil mounted in a ferromagnetic shell, said shell secured to said alternator base;

rotor means, including a continuous permanent magnet ring rotatably and concentrically interposed between said field coil and stator, said rotor means arranged in the plane of said stator and field coil, and rotatably driven for generating a voltage in said stator coil.

11. The alternator-compressor of claim 10 wherein the magnetic flux generated by said field coil and said permanent magnet interact to cause the voltage generated by said alternator to vary as a function of the voltage applied to said field coil.

12. The alternator-compressor of claim 11 wherein said voltage applied to said field coil is controlled by a voltage regulator circuit.

13. The alternator-compressor of claim 10 wherein said rotor defines two halves, each half having circumferentially arranged pole pieces which are interleaved with the pole pieces of the other rotor half.

14. The alternator-compressor of claim 10 wherein said permanent magnet is a ring magnet having an array of north poles located along one rim and an array of south poles located along another rim.

15. The alternator-compressor of claim 10 wherein said compressor housing is aluminum.

16. The alternator-compressor of calim 21 wherein the flux generated by said permanent magnet and the flux generated by said field coil are subtactive in a first apart of said flux path and are additive in a second part of said flux path.

17. The alternator compressor of claim 6 and including a voltage regulator circuit connected to said field coil for controlling the magnitude of voltage applied to said field coil whereby the voltage generated by said alternator compressor is constant for varying rotational speeds of said rotor and for varying loading conditions of said alternator.

18. The alternator-compressor of claim 6 wherein said cylindrical permanent magnet has like magnetic poles circumferentially arranged along one rim and opposing magnetic poles circumferentially arrayed along the opposite rim.

19. The alternator-compressor of claim 6 and including a magnetizable shell secured to said alternator base and forming a cavity therewith for said field coil and further including a magnetizable member located between one side of said coil and a side of said rotor for conducting magnetic flux.

* * * * *

UNITED STATES PATENT AND TRADEMARK OFFICE
CERTIFICATE OF CORRECTION

PATENT NO. : 4,654,551

DATED : March 31, 1987

INVENTOR(S) : JAMES B. FARR

It is certified that error appears in the above-identified patent and that said Letters Patent is hereby corrected as shown below:

```
Claim 16, Col. 12, line 9, change "Calim 21" to --Claim 21--;
Claim 16, Col. 12, line 11, change "subtactive" to
     --subtractive--;
Claim 16, Col. 12, line 12, change "apart" to --part--.
```

Signed and Sealed this

First Day of September, 1987

Attest:

DONALD J. QUIGG

Attesting Officer      Commissioner of Patents and Trademarks